3,274,279
REMOVAL OF REACTION PRODUCTS OF WATER, BORON FLUORIDE, ETC. FROM HYDROCARBONS
Ernest L. Pollitzer, Hinsdale, Ill., assignor to Universal Oil Products Company, Des Plaines, Ill., a corporation of Delaware
No Drawing. Filed May 31, 1962, Ser. No. 198,768
12 Claims. (Cl. 260—674)

This invention relates to a process for the removal of the reaction products of water, boron halide, and a boron halide-modified substantially anhydrous inorganic oxide from a substantially anhydrous fluid containing the same, and more particularly relates to a process for the removal of the reaction products of water, boron halide, and a boron halide-modified substantially anhydrous inorganic oxide from a substantially anhydrous fluid containing the same by contacting said reaction products and fluid with a removal agent comprising a metal hydride selected from the group consisting of lithium hydride, sodium hydride, potassium hydride, rubidium hydride, cesium hydride, calcium hydride, strontium hydride and barium hydride. Still more particularly, this invention relates to a process for the removal of the reaction products of water, boron halide, and a boron halide-modified substantially anhydrous inorganic oxide from a substantially anhydrous fluid containing the same by contacting said reaction products and fluid with a removal agent comprising a metal hydride selected from the group consisting of lithium hydride, sodium hydride, potassium hydride, rubidium hydride, cesium hydride, calcium hydride, strontium hydride and barium hydride, in a reaction zone at reaction conditions, reacting at least a portion of said reaction products with said removal agent, and recovering substantially purified fluid.

It has been found that in the production of alkylated aromatic hydrocarbons utilizing a boron fluoride-modified substantialy anhydrous inorganic oxide, alkylatable aromatic hydrocarbon, olefin-acting compound, and boron fluoride, reaction products of water, boron fluoride, and boron fluoride-modified substantially anhydrous inorganic oxide tend to form, accumulate and contaminate the process streams. The principal object of the present invention is to provide a process for the efficient and economical removal of these reaction products from the hereinbefore mentioned contaminated process streams. The process streams may include the presence of substantially anhydrous gaseous mixtures or substantially anhydrous liquid hydrocarbon, such as an aromatic hydrocarbon comprising benzene, or higher homologs of benzene.

Another object of this invention is to provide a process whereby the reaction products of water, boron halide, and boron halide-modified substantially anhydrous inorganic oxide can be removed continuously from the hereinabove mentioned process streams without appreciable consumption or loss of the recovered decontaminated stream. Other objects of this invention will be set forth hereinafter as part of the specification and in the accompanying examples.

In one embodiment, the present invention relates to a process for removing the reaction products of water, boron halide, and a boron halide-modified substantially anhydrous inorganic oxide from a substantially anhydrous fluid containing the same which comprises contacting said reaction products and fluid with a removal agent comprising a metal hydride selected from the group consisting of lithium hydride, sodium hydride, potassium hydride, rubidium hydride, cesium hydride, calcium hydride, strontium hydride and barium hydride, in a reaction zone at reaction conditions, reacting at least a portion of said reaction products with said removal agent, and recovering substantially purified fluid.

Another embodiment of the present invention relates to a process for removing the reaction products of water, boron fluoride, and a boron fluoride-modified substantially anhydrous inorganic oxide from a substantially anhydrous fluid containing the same which comprises contacting said reaction products and fluid with a removal agent comprising a metal hydride selected from the group consisting of lithium hydride, sodium hydride, potassium hydride, rubidium hydride, cesium hydride, calcum hydride, strontium hydride and barium hydride, in a reaction zone at reaction conditions including a temperature of from about 0° to about 300° C. and a pressure of from about atmospheric to about 200 atmospheres, reacting at least a portion of said reaction products with said removal agent, and recovering substantially purified fluid.

A specific embodiment of the present invention relates to a process for removing the reaction products of water, boron fluoride, and a boron fluoride-modified substantially anhydrous inorganic oxide from substantially anhydrous benzene containing the same which comprises contacting said reaction products and benzene with sodium hydride in a reaction zone at reaction conditions including a temperature of from about 0° to about 300° C. and a pressure of from about atmospheric to about 200 atmospheres, reacting at least a portion of said reaction products with said sodium hydride, and recovering substantially purified benzene.

A further specific embodiment of the present invention relates to a process for removing the reaction products of water, boron fluoride, and a boron fluoride-modified substantially anhydrous inorganic oxide from a substantially anhydrous refinery off-gas containing the same which comprises contacting said reaction products and refinery off-gas with strontium hydride in a reaction zone at reaction conditions including a temperature of from about 0° to about 300° C. and a pressure of from about atmospheric to about 200 atmospheres, reacting at least a portion of said reaction products with said strontium hydride, and recovering substantially purified refinery off-gas.

Other embodiments of the present invention will become apparent in considering the specification as hereinafter set forth.

As set forth hereinabove, the present invention relates to a process for the removal of the reaction products of water, boron halide, and a boron halide-modified substantially anhydrous inorganic oxide from a fluid utilizing a removal agent comprising a metal hydride selected from the group consisting of lithium hydride, sodium hydride, potassium hydride, rubidium hydride, cesium hydride, calcium hydride, strontium hydride and barium hydride. These reaction products of water, boron halide, and boron halide-modified substantially anhydrous inorganic oxide have been encountered as the hydrides of boron trifluoride including boron trifluoride monohydrate, boron trifluoride dihydrate, boron trifluoride trihydrate, etc. In addition to the hereinabove mentioned compounds, other compounds comprising boron, hydrogen, oxygen and fluorine, may be present as aforesaid, such as, for example, $B(OH)_2F$, $B(OH)F_2$, etc. Intermediate solid but volatile materials, containing boron, oxygen and fluorine in approximately equal atomic amounts are also sometimes encountered. These compounds are also sometimes encountered in combination with each other, with water, or with boron trifluoride, as well as by themselves. It will be appreciated by those skilled in the art that the foregoing list of compounds has by no means exhausted the total number of compounds that may form reversibly when water and boron halide are present in a fluid process stream. Such enumerations are intended to be exemplary only and not limiting to the broad scope of the present invention.

Suitable metal hydrides utilizable as decontamination or removal agents in the process of this invention include those selected from the group consisting of lithium hydride, sodium hydride, potassium hydride, rubidium hydride, cesium hydride, calcium hydride, strontium hydride and barium hydride, as hereinbefore set forth. Of the above-mentioned metal hydrides, sodium hydride is particularly preferred for removing the reaction products of water, boron fluoride, and a boron fluoride-modified substantially anhydrous inorganic oxide from a substantially anhydrous fluid. It is also contemplated within the scope of this invention that the hereinbefore mentioned metal hydrides may, if desired, be disposed or composited on an inorganic oxide support.

The inorganic oxide which may be utilized in the process of this invention as a support for the removal agent if desired, or as the boron trifluoride-modified substantially anhydrous inorganic oxide, may be selected from among diverse inorganic oxides including alumina, silica, boria, oxides of phosphorous, titanium dioxide, zirconium dioxide, chromia, zinc oxide, magnesia, calcium oxide, silica-alumina, silica-magnesia, silica-alumina-magnesia, silica-alumina-zirconia, chromia-alumina, alumina-boria, silica-zirconia, etc., and various naturally occurring inorganic oxides of various states of purity such as bauxite, clay (which may or may not have been previously acid treated), diatomaceous earth, etc. If desired, either the same or unlike inorganic oxides may be utilized as the support for the removal agent and as the boron trifluoride-modified inorganic oxide. Of the above-mentioned inorganic oxides, it is preferred, although not necessarily, that the refractory inorganic oxide has a high surface area. By the term high surface area is meant a surface area measured by surface adsorption techniques within the range of from about 25 to about 500 or more square meters per gram and preferably having a surface area of approximately 100 to 300 square meters per gram. For example, gamma-alumina which has a surface area ranging from about 100 to about 300 square meters per gram, and which has been freed from adsorbed water and which contains little combined water, is a satisfactory refractory inorganic oxide utilizable in the process of the present invention. Particularly preferred refractory inorganic oxides utilized in the process of this invention as a support for the removal agent is desired, or as the boron trifluoride-modified substantially anhydrous inorganic oxide include high surface area crystalline alumina modifications such as gamma-, eta- and theta-alumina, although these are not necessarily of equivalent suitability. However, the limitation on the use of any particular refractory inorganic oxide is one of freedom from combined or adsorbed water in combination with the high surface area of the support selected. In addition to the aforementioned gamma-, eta- and theta-aluminas which may be utilized as refractory inorganic oxides, it is also contemplated that the hereinbefore mentioned refractory oxides which possess the necessary surface area characteristics and which are in a substantially anhydrous state may also be utilized.

Many fluids and fluid mixtures can be substantially purified utilizing the process of the present invention. Suitable gases include such components as hydrogen, methane, ethane, propane, inert gases, boron halides, etc., and mixtures thereof. Suitable liquid hydrocarbons include those such as the paraffins, cycloparaffins, aromatics, etc. and mixtures thereof. Suitable paraffins are normal butane, isobutane, normal pentane, isopentane, normal hexane, etc. Suitable cycloparaffins are cyclopentane, methylcyclopentane, cyclohexane, methylcyclohexane, and other alkylcycloparaffins and mixtures thereof. Suitable aromatic hydrocarbons include benzene, toluene, and other alkyl benzenes and mixtures thereof. Preferred hydrocarbons are monocyclic aromatic hydrocarbons, that is, benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc., and mixtures thereof. Very often alkylate is obtained as a high boiling fraction in which the alkyl group attached to the aromatic nucleus varies in size from about $C_9$ to $C_{18}$. Other suitable aromatic hydrocarbons, which at specified reaction conditions, depending upon the melting point of the compound chosen, would be in liquid form, would include hydrocarbons with two or more aryl groups such as diphenyl, diphenyl methane and others. Examples of other aromatic hydrocarbons within the scope of this invention which at specified reaction conditions depending upon the melting point of the compound chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

The process of this invention may be successfully applied to and utilized with olefinic hydrocarbons. Suitable olefins include monoolefins containing one double bond per molecule and polyolefins which contain more than one double bond per molecule. Thus, suitable olefins include ethylene, propylene, 1-butene, 2-butene, isobutylene, and higher molecular weight normally liquid olefins such as the various pentenes, hexenes, heptenes, octenes and mixtures thereof, and still higher molecular weight liquid olefins, the latter including various olefin polymers having from about 9 to about 18 carbon atoms per molecule including propylene trimer, propylene tetramer, propylene pentamer, etc. Cycloolefins such as cyclopentene, methylcyclopentene, cyclohexene, methylcyclohexene, etc., may also be utilized.

The process of this invention may be utilized when these hydrocarbons are present as mixtures in minor quantities in various gas streams. Thus, the normally gaseous hydrocarbon for use in the process of this invention need not be concentrated. Such normally gaseous hydrocarbons appear in minor quantities in various refinery gas streams, usually diluted with gases such as hydrogen, nitrogen, methane, etc. These gas streams are obtained in petroleum refineries from various refinery installations including thermal cracking units, catalytic cracking units, thermal reforming units, coking units, polymerization units, dehydrogenation units, etc. Such refinery gas streams have in the past often been burned for fuel value, since an economical process for the utilization of their hydrocarbon content has not been available, or processes which have been suggested by the prior art may not have been economically feasible. A typical analysis in mol percent for utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7% and $C_4$ hydrocarbons, 0.5%.

In accordance with the process of the present invention, the removal of the reaction products of water, boron halide, and boron halide-modified substantially anhydrous inorganic oxide from a substantially anhydrous fluid mixture containing the same is effected by contacting said reaction products with a removal agent comprising a metal hydride selected from the group consisting of lithium hydride, sodium hydride, potassium hydride, rubidium hydride, cesium hydride, calcium hydride, strontium hydride and barium hydride at a temperature of from about 0° or lower to about 300° C. or higher and preferably from about 50° to about 250° C., although the exact temperature needed will depend upon the particular fluid to be purified, the particular removal agent utilized, and the pressure of the reaction zone. The process is usually carried out at a pressure of from about atmospheric to about 200 atmospheres. The pressure utilized is usually selected to effect the desired reaction.

In removing the hereinbefore mentioned reaction products from a fluid containing the same with a type of reaction media herein described, either batch or continuous operations may be employed. The actual operation of the process may either be upflow or downflow. The removal agents may be utilized in the form of granules, grains, powders, particles, spheres, balls, tubular shapes, etc. The details or processes of this general character are familiar to those skilled in the art and any necessary additions or modifications of the above general procedures will be more or less obvious and can be made without departing from the broad scope of this invention.

The process of this invention is illustrated by the following examples which are introduced for the purpose of illustration and with no intention of unduly limiting the generally broad scope of the invention.

*Example I*

This example illustrates the effect of the formation of the reaction products of water, boron halide, and a boron halide-modified substantially anhydrous inorganic oxide during the production of alkylated aromatics. The processing unit consisted of liquid and gas charge pumps, reactors, high pressure gas separators, pressure controllers, boron fluoride treating system, feed pretreating system, fractionating columns, and liquid and gas collection systems. The catalyst charged to the reactors comprised a boron fluoride-modified substantially anhydrous inorganic oxide of high surface area, namely boron trifluoride-modified alumina. The unit was starting up according to standard procedures so that ethylbenzenes was produced. Substantially pure boron trifluoride was charged to the unit in sufficient quantity along with substantially anhydrous benzene and ethylene so that the benzene was converted to ethylbenzene. Additional boron trifluoride was added as needed to maintain good conversion. Operating temperatures were held at a minimum consistent with good conversion. The operating pressure was selected so that the benzene was kept substantially in the liquid phase. The aromatic to olefin ratio was kept at a maximum at all times consistent with the equipment limitations, in order to insure low polyethylbenzene production. The fractionation section first separated part of the benzene recycle by flash and then the remainder by fractionation. The maximum recycle possible was flashed because of the lower heat requirement for flashing until the ethylbenzene and heavier products present became a contamination factor. Most of the boron fluoride was in the effluent vapors. Part of this boron fluoride was condensed with the benzene recycle and returned to the reactor. The remaining boron fluoride passed into the boron fluoride treating system where it was absorbed and returned to the reactor by compressor after being stripped from the absorbent. The liquid from the hot flash was sent to the benzene fractionating column where after removal of the remaining recycle benzene in the benzene column the ethylbenzene and heavier products were fractionated into an ethylbenzene cut in the overhead of the ethylbenzene column and a bottom cut. The overhead was sent to storage. The fractionator bottoms were recycled back to a second reactor where the polyethylbenzenes were transalkylated to produce ethylbenzene.

During the production of ethylbenzene in the hereinabove outlined process flow scheme, it was observed that the reaction products of water, boron fluoride and the boron fluoride-modified alumina tended to form and accumulate in the process streams. The overall efficiency of the alkylation process decreased as the concentration of these reaction products became higher. Continued formation of these reaction products caused the eventual shut down of the plant.

*Example II*

This example illustrates the substantial removal of the reaction products of water, boron fluoride, and a boron fluoride-modified substantially anhydrous alumina during the production of an alkylated aromatic compound. The same processing unit described in Example I is utilized for the experiment described in this example.

The process flow scheme is modified so that a reaction zone containing lithium hydride is introduced into the recycle benzene stream that had previously contained reaction products. The substantially anhydrous liquid benzene is passed downflow through the zone at 500 p.s.i.g. and 70° C. Chemical analysis of the benzene before the reaction zone indicates the presence of reaction products of water, boron fluoride, and the boron fluoride-modified substantially anhydrous alumina. Chemical analysis of the benzene after the reaction zone indicates substantial removal occurring.

The overall efficiency of the alkylation process is maintained at the desired level with the reaction zone containing the lithium hydride in place as evidenced by the continuous production of ethylbenzene until the plant is shut down at the completion of the run.

*Example III*

This example illustrates the substantial removal of the reaction products of water, boron fluoride, and a boron fluoride-modified substantially anhydrous alumina during the production of an alkylated aromatic compound. The same processing unit described in the preceding examples is utilized for the experiment described in this example.

The process flow scheme is modified so that a reaction zone containing sodium hydride is introduced into the recycle benzene stream that had previously contained reaction products. The substantially anhydrous liquid benzene is passed upflow through the reaction zone at 550 p.s.i.g. and 70° C. Chemical analysis of the benzene before the reaction zone indicates the presence of the reaction products of water, boron fluoride, and the boron fluoride-modified alumina. Chemical analysis of the benzene after the reaction zone indicates substantial removal occurring.

The overall efficiency of the alkylation process is maintained at the desired level with the reaction zone containing the sodium hydride in place as evidenced by the continuous production of ethylbenzene until the plant is shut down at the completion of the run.

*Example IV*

This example further illustrates the substantial removal of the reaction products of water, boron fluoride and a boron fluoride-modified substantially anhydrous alumina during the production of an alkylated aromatic compound. The same processing unit described in the preceding examples is utilized for the experiment described in this example.

The process flow scheme is modified so that a reaction zone containing potassium hydride is introduced into the ethylbenzene product stream. The substantially anhydrous ethylbenzene is passed downflow through the reaction zone at 500 p.s.i.g. and 100° C. Chemical analysis of the ethylbenzene before the reaction zone indicates the presence of the reaction products of water, boron fluoride, and the boron fluoride-modified substantially anhydrous theta-alumina. Chemical analysis of the ethylbenzene after the reaction zone indicates substantial removal occurring.

The quality of the ethylbenzene produced is maintained at the desired level with the reaction zone containing the potassium hydride in place until the plant is shut down at the completion of the run.

*Example V*

This example also illustrates the substantial removal of the reaction products of water, boron fluoride, and a boron fluoride-modified substantially anhydrous alumina during the production of an alkylated aromatic compound. The same processing unit described in the previous examples is utilized for the experiment described in this example.

The process flow scheme is modified so that a reaction zone containing strontium hydride is introduced into a gas stream comprising nitrogen, hydrogen, methane, ethylene and boron trifluoride. The substantially anhydrous gaseous mixture is passed upflow through the reaction zone at 500 p.s.i.g. and 50° C. Chemical analysis of the gaseous mixture before the reaction zone indicates the presence of reaction products. Chemical analysis of the gaseous mixture after the reaction zone indicates substantial removal occurring.

The overall efficiency of the alkylation process is maintained at the desired level with the reaction zone containing the strontium hydride in place as evidenced by the continuous production of ethylbenzene until the plant is shut down at the completion of the run.

*Example VI*

This example still further illustrates the substantial removal of the reaction products of water, boron fluoride, and a boron fluoride-modified substantially anhydrous alumina during the production of an alkylated aromatic compound. The same processing unit described in the preceding examples is utilized for the experiment described in this example.

The process flow scheme is modified so that a reaction zone containing calcium hydride is introduced into a gas stream comprising ethylene. The substantially anhydrous ethylene is passed upflow through the calcium hydride at 500 p.s.i.g. and 125° C. Chemical analysis of the gas before the reaction zone indicates the presence of reaction products. Chemical analysis of the gas after the reaction zone indicates substantial removal occurring.

The overall efficiency of the alkylation process is maintained at the desired level with the reaction zone containing the calcium hydride in place as evidenced by the continuous production of ethylbenzene until the plant is shut down at the completion of the run.

Similar results will be obtained with lithium hydride disposed on alumina, sodium hydride disposed on alumina, potassium hydride disposed on silica-alumina, strontium hydride disposed on silica and calcium hydride disposed on alumina as removal agents utilizing the process of the present invention.

I claim as my invention:

1. A process for removing the reaction products of water, boron fluoride, and a boron fluoride-modified substantially anhydrous inorganic oxide from a substantially anhydrous hydrocarbon stream containing the same which comprises contacting said stream with a removal agent comprising a metal hydride selected from the group consisting of lithium hydride, sodium hydride, potassium hydride, rubidium hydride, cesium hydride, calcium hydride, strontium hydride and barium hydride, in a reaction zone at reaction conditions including a temperature of from about 0° to about 300° C. and a pressure of from about atmospheric to about 200 atmospheres, reacting at least a portion of said reaction products with said removal agent, and recovering purified hydrocarbon.

2. The process of claim 1 further characterized in that said removal agent comprises lithium hydride.

3. The process of claim 1 further characterized in that said removal agent comprises sodium hydride.

4. The process of claim 1 further characterized in that said removal agent comprises potassium hydride.

5. The process of claim 1 further characterized in that said removal agent comprises strontium hydride.

6. The process of claim 1 further characterized in that said removal agent comprises calcium hydride.

7. The process of claim 1 further characterized in that said hydride is disposed on alumina.

8. A process for removing the reaction products of water, boron fluoride, and a boron fluoride-modified substantially anhydrous inorganic oxide from a substantially anhydrous hydrocarbon gas containing the same which comprises contacting said reaction products and gas with a removal agent comprising a metal hydride selected from the group consisting of lithium hydride, sodium hydride, potassium hydride, rubidium hydride, cesium hydride, calcium hydride, strontium hydride and barium hydride, in a reaction zone at reaction conditions including a temperature of from about 0° to about 300° C. and a pressure of from about atmospheric to about 200 atmospheres, reacting at least a portion of said reaction products with said removal agent, and recovering substantially purified gas.

9. A process for removing the reaction products of water, boron fluoride, and a boron fluoride-modified substantially anhydrous inorganic oxide from a substantially anhydrous liquid hydrocarbon containing the same which comprises contacting said reaction products and liquid hydrocarbon with a removal agent comprising a metal hydride selected from the group consisting of lithium hydride, sodium hydride, potassium hydride, rubidium hydride, cesium hydride, calcium hydride, strontium hydride and barium hydride, in a reaction zone at reaction conditions including a temperature of from about 0° to about 300° C. and a pressure of from about atmospheric to about 200 atmospheres, reacting at least a portion of said reaction products with said removal agent, and recovering substantially purified liquid hydrocarbon.

10. A process for removing the reaction products of water, boron fluoride, and a boron fluoride-modified substantially anhydrous inorganic oxide from substantially anhydrous benzene containing the same which comprises contacting said reaction products and benzene with lithium hydride in a reaction zone at reaction conditions including a temperature of from about 0° to about 300° C. and a pressure of from about atmospheric to about 200 atmospheres, reacting at least a portion of said reaction products with said lithium hydride, and recovering substantially purified benzene.

11. A process for removing the reaction products of water, boron fluoride, and a boron fluoride-modified substantially anhydrous inorganic oxide from substantially anhydrous benzene containing the same which comprises contacting said reaction products and benzene with sodium hydride in a reaction zone at reaction conditions including a temperature of from about 0° to about 300° C. and a pressure of from about atmospheric to about 200 atmosphere, reacting at least a portion of said reaction products with said sodium hydride, and recovering substantially purified benzene.

12. A process for removing the reaction products of water, boron fluoride, and a boron fluoride-modified substantially anhydrous inorganic oxide from substantially anhydrous ethylbenzene containing the same which comprises contacting said reaction products and ethylbenzene with potassium hydride in a reaction zone at reaction conditions including a temperature of from about 0° to about 300° C. and a pressure of from about atmospheric to about 200 atmospheres, reacting at least a portion of said reaction products with said potassium hydride, and recovering substantially purified ethylbenzene.

References Cited by the Examiner

UNITED STATES PATENTS

| | | | |
|---|---|---|---|
| 1,681,702 | 8/1928 | Jost | 23—2.1 X |
| 2,409,372 | 10/1946 | Matuszak | 260—683.41 |
| 2,442,343 | 6/1948 | Burk et al. | 260—671 |
| 2,971,992 | 2/1961 | Bloch | 260—671 |

FOREIGN PATENTS 872,333   7/1961   Great Britain.

DELBERT E. GANTZ, *Primary Examiner.*

M. A. BRINDISI, *Examiner.*

E. STERN, C. E. SPRESSER, JR., *Assistant Examiners.*